INVENTOR
GENUNG L. CLAPPER

BY John B Frisbone
ATTORNEY 3,540,002

CONTENT ADDRESSABLE MEMORY

Genung L. Clapper, Raleigh, N.C., assignor to International Business Machines Corporation, Armonk, N.Y., a corporation of New York Filed Feb. 26, 1968, Ser. No. 708,333
Int. Cl. G11c 15/00
U.S. Cl. 340—172.5 11 Claims

ABSTRACT OF THE DISCLOSURE

A word oriented solid state content-addressable memory having a four-state input register with one position for each bit position in the word for simultaneously applying an input code to all bit positions of each word in the memory. Each memory element matching the associated input bit providing a discrete output to an associated word summation line. A decision unit connected to each summation line and to a common interlock circuit indicates that summation line having the highest output and thus the match or best match for the input.

BACKGROUND OF THE INVENTION

Field of the invention

The invention relates to memories and more particularly content-addressable or associative memories using solid state storage elements which are simultaneously addressed.

Description of the prior art

Prior art content-addressable or associative memories have been built with magnetic, cryogenic and bistable semiconductor memory elements or cells.

Magnetic core memory cells in various forms have been utilized for this purpose. In every instance, "ripple-interrogation" must be used to overcome the noise problem. The "ripple-interrogation" technique, however, presents a serious problem since the cycle time is extended by the number of bit positions. Since the bits must be interrogated serially, the cycle time of a 2 $\mu$s. memory would be 100–200 $\mu$s. for a 50–100-bit word length memory. This is too long for a practical memory. Thin film memories are capable of higher operating speeds, however, serial or "ripple-interrogation" must still be used.

Cryogenic memories at one time seemed to show the greatest promise from the standpoint of economical mass production, however, other problems such as the high cost of refrigeration, difficulties of interfacing and complex circuit behavior have prevented use in large scale memories. Cryogenic memories offer the advantage of parallel-bit matching with resultant low cycle times but the disadvantages set forth above have prevented acceptance of this type of memory for use in content-addressable applications.

Tunnel diodes and transistor binary cells have been used in small content-addressable memories but due to their complexity and cost, they have been limited in use to very small capacity memories.

In addition to the above, there have been suggestions of programmed controlled content addressable memories. This approach does not seem feasible since the basic reason for using content-addressable memories is to relieve programming of the housekeeping functions such as address assignment, indexing, etc. which require time and storage.

SUMMARY OF THE INVENTION

The invention contemplates a content addressable memory for providing an indication of which word stored in the memory most nearly matches a word applied to the input register of the memory. The memory includes an array of memory cells arranged in word rows and bit columns. Each of the cells has a pair of storage elements each of which is capable of assuming a first or second stable state, means for connecting the input register to all corresponding memory storage elements, respectively, to provide outputs from those storage elements in the first stable state which are connected to input register elements in the same state, means connected to each word row for summing the outputs of the storage elements in its row and means responsive to all the summation means for indicating which summation means and word row has the largest sum and therefore matches or most nearly matches the contents of the input register.

One object of this invention is to provide a content-addressable memory in which every word and all of the bits in the word are simultaneously compared with an input word and that word in storage which matches or most nearly matches the input word is indicated and may be read out of storage.

Another object of the invention is to provide a content-addressable memory as set forth above which may be implemented in monolithic circuits to achieve high density, low manufacturing cost and increased reliability.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
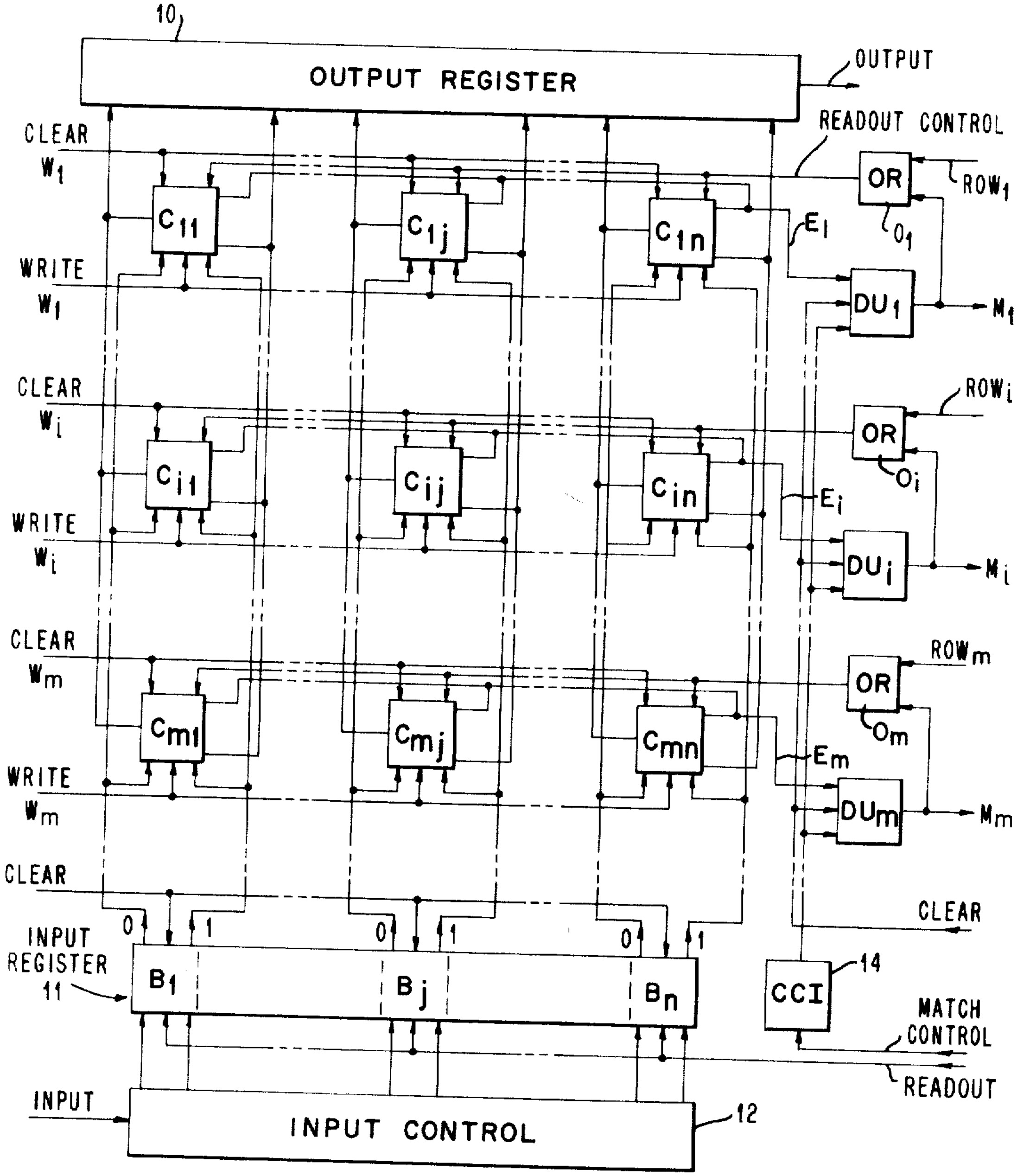
FIG. 1 is a block diagram of a novel content-addressable memory constructed in accordance with the invention.

The block diagram of FIG. 1 illustrates the general organization of the novel content-addressable memory. An $(m \times n)$ memory is illustrated with the gaps indicated to simplify the drawing. Illustrated are three horizontal rows or words lines $W_1$, $W_i$ and $W_m$. Each has $n$ memory cells of which three memory cells, C, are shown. Cells $C_{11}$ through $C_{1n}$ store in order $n$ binary bits defining word $W_1$. Similarly cells $C_{i1}$ through $C_{in}$ store in order $n$ binary bits defining the words intermediate $W_1$ and $W_m$ which last word has cells $C_{m1}$ through $C_{mn}$. A typical memory of this type will have 256 or more word lines of storage, each of which may have 100 to 200 bits. The additional necessary equipment to implement such a memory will be connected as shown and has been eliminated in the illustrated circuit in the interest of clarity.

Each word line has common clear, write, sum ($\Sigma_1$ to $\Sigma_m$) and readout control wires connected in parallel to all memory cells. Each cell includes a pair of storage elements, which will be described in detail later, having an output and an input. The outputs of the elements of the corresponding bit positions are connected to a conventional output register 10. The inputs of the elements of the corresponding bit positions are connected to one stage of an input register 11 which, because of its novel construction will be described in detail later. The input register 11 has three stages $B_l$, $B_j$ and $B_n$ illustrated and these are connected to the inputs of the *l*, *j* and *n* cells, respectively. The input signals, that is, signals which are to be inserted in memory or signals which are to be searched in memory, are applied to register 11 via any conventional input control circuit 12.

Input control circuit 12 may take any known form. It may, for example, provide serial to parallel conversion where the input signal is supplied in serial form or it may provide the necessary switching and gating for parallel signals. In some systems both may be required. Neither the input control 12 nor the output register 10 will be described in detail since the prior art is replete with many forms which may be utilized in the invention.

Figure 3:
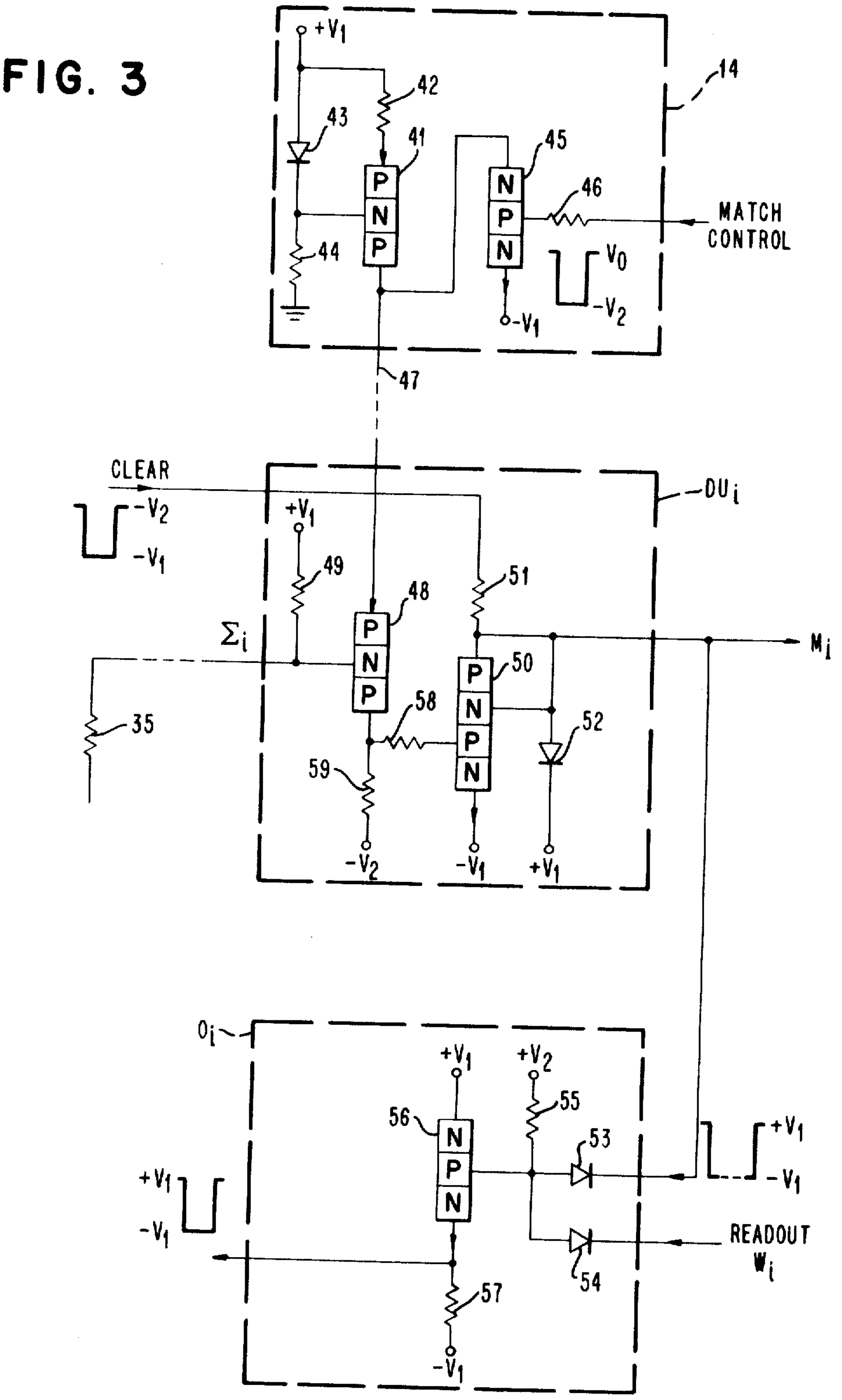
FIG. 3 is a schematic diagram of a single decision unit and "OR" gate, and of the constant current interlock circuit shown in block form in FIG. 1.

Summation lines $\Sigma_l$, $\Sigma_i$ and $\Sigma_m$ are connected to decision units $DU_l$, $DU_i$ and $DU_m$, respectively, which in cooperation with a constant current interlock circuit 14 provide an indication, on output lines $M_l$, $M_i$ and $M_m$, of which word in storage matches or most nearly matches the word in the input register 11. The details of the Decision Units and of the constant current interlock circuit 14 are illustrated in FIG. 3 and will be described later in connection with the description of that figure.

Individual readout signals $ROW_l$, $ROW_i$ and $ROW_m$ are provided to the "readout control" lines associated with word lines $W_l$, $W_i$ and $W_m$ via OR gates $O_l$, $O_i$ and $O_m$, respectively. The outputs of decision units $DU_l$, $DU_i$ and $DU_m$ are also connected to the "readout control" lines by these same OR gates.

The memory must be cleared before a new word may be entered into memory and each word line may be cleared without interacting with another word line by applying from an external source, under program control, an appropriate clear signal on its associated "clear" line. After a line is cleared, data may be entered into that line by inserting the data in the input register 11 and energizing under program control the appropriate "write" line.

Once the memory is loaded, addressing may be accomplished by switching the addressing data into the input register 11. However before the addressing data is entered into the input register 11, the register stages must be cleared by applying an appropriate clear signal to the clear line. When this is done each stage $B_l$–$B_n$ is set to the "blank" or "mask" state and not to the "zero" state. This register contains four states and will be described in greater detail later. In the "blank" or "mask" state, all memory cells are inhibited from "reading," "writing" or "summing." Thus if matching is desired on selected bit positions only, the other bit positions of the input register 11 are, under program control, left in the "blank" or "mask" state.

As soon as the input register 11 is loaded, each cell whose state corresponds to its associated stage of register 11 provides a unit of current to the summation line to which it is connected. A match control signal supplied by the operating program is applied to the constant current interlock circuit 14 and that decision unit DU having the largest current applied thereto and therefore an exact or best match provides an output on line M. Thus, via the connected OR gate O the matching bits are immediately available in the output register 10. If the entire word in storage, including any masked bits is desired, a readout signal must be applied to input register 11. The readout signal applied to register 11 conditions all memory elements and the appropriate M line previously selected causes readout of its line. When readout is complete, the decision units $DU_l$–$DU_m$ are cleared and register 11 is cleared so that another addressing operation may take place.

Any word in memory may be read at any time by applying a readout signal to register 11 and appropriate readout control signal ROW via the appropriate OR gate O. The readout applied to register 11 conditions all the cells in the memory and readout control gates the conditioned cells to which it is applied. The operation of the individual cells and the cooperation of the various signals set forth will become apparent as FIGS. 2 and 3 are described.

Figure 2:
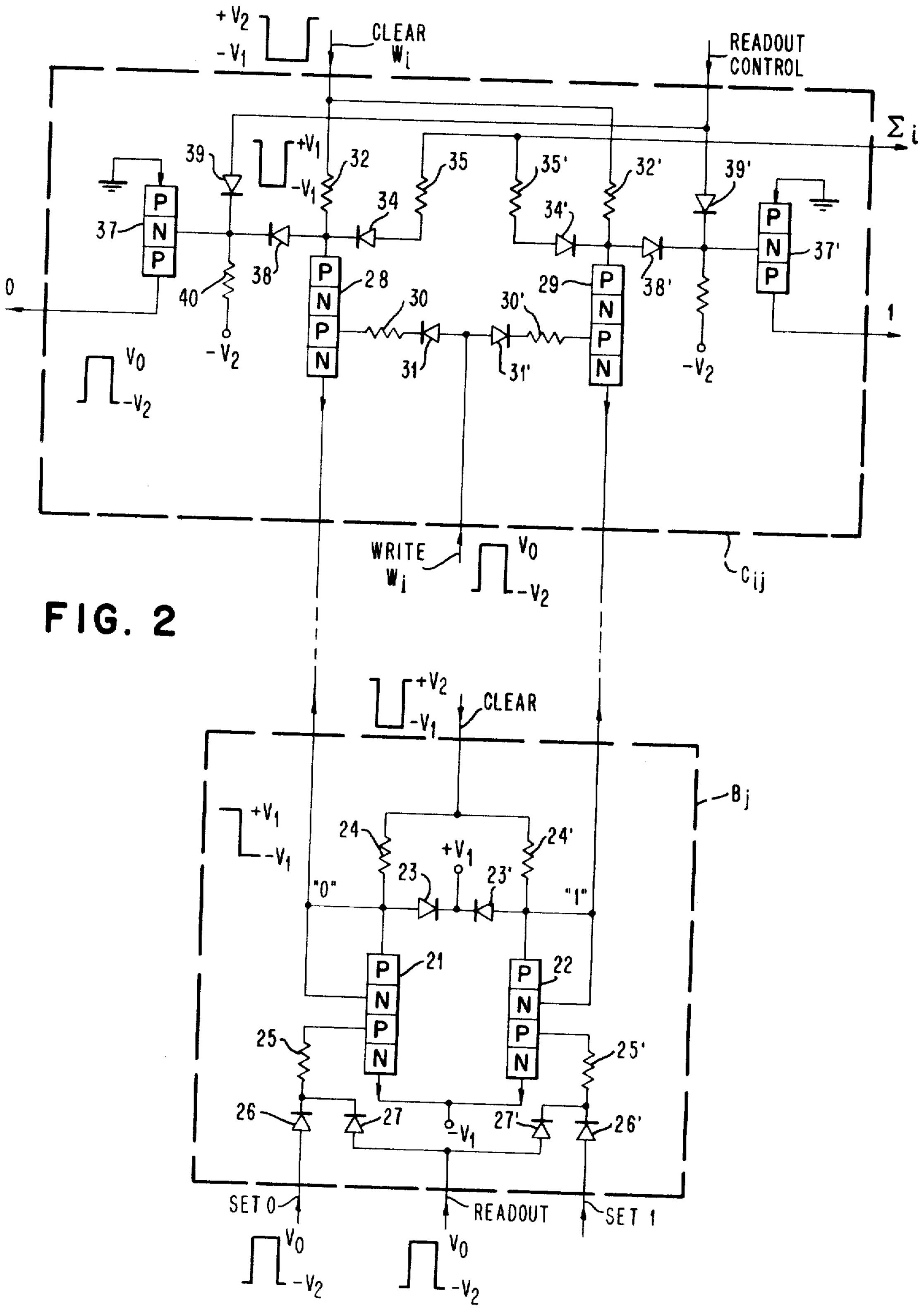
FIG. 2 is a schematic diagram of a single input register position and a single memory cell shown in block form in FIG. 1.

In FIG. 2, a representative memory cell $C_{ij}$ and one data position $B_j$ of register 11 are illustrated in detail. All of the other cells and register positions would be identical and connected as shown in FIG. 1.

Position $B_j$ of input register 11 includes a pair of silicon controlled switches 21 and 22. The anode of the switch 21 is connected to a $+V_1$ supply by a diode 23 and to the clear line which is normally at $+V_2$ by a resistor 24. Both the anode and anode gate are directly connected to the "zero" output of the input register for this stage. The cathode of silicon controlled switch 21 is connected directly to a $-V_1$ supply and the control gate is connected by a resistor 25 and a pair of isolating diodes 26 and 27 to the "set 0" and "readout" lines, respectively. Silicon control switch 22 is connected by the identical circuit elements in the same manner as in switch 21 and these are indicated by using identical reference numerals primed. The anode of switch 22 provides the "one" output for the stage.

Register $B_j$ is provided with two outputs "0" and "1" which may assume any one of four conditions or states. The outputs "0" and "1" may be simultaneously $+V_1$ volts or simultaneously $-V_1$ volts. When both outputs are $+V_1$ volts, the stage is considered to be in a "don't care" or "mask" state. When both outputs are simultaneously $-V_1$ volts, the data in any word line which has a readout control signal applied thereto may be read. In addition, the outputs "0" and "1" may be respectively $-V_1$ and $+V_1$ volts to indicate a "zero" storage condition or they may be $+V_1$ and $-V_1$ volts, respectively, to indicate a "one" storage condition. Normally after a clear pulse is applied to the clear line connected to the anode of switches 21 and 22 via resistors 24 and 24' respectively, the outputs "0" and "1" simultaneously go to $+V_1$. This is so since the diode clamps 23 and 23' clamp the anodes of switches 21 and 22 to $+V_1$ volts. Thereafter, the register position may be set to a "0" by changing the "set 0" input connected to diode 26 from a normal state of $-V_2$ to $V_0$ volts. This causes silicon control switch 21 to conduct and the anode and the "0" output connected thereto assume the $-V_1$ voltage thus indicating a "zero" storage condition. Isolating diode 27 prevents feeding of this setting voltage to the 1 input. In order to set the stage to a one storage condition, the stage must be cleared by applying a $-V_1$ pulse to the anode to interrupt conduction through switch 21. After clearing, a "set 1" pulse is applied, that is, the "set 1" line connected to diode 26' is changed from from $-V_2$ to $V_0$ to cause conduction through switch 22. This causes the anode of that switch and the "1" output line to go to $-V_1$ volts to indicate a one storage condition. Here again the "0" output will remain at $+V_1$.

Readout is accomplished by applying the same type pulse, that is, changing the readout line from $-V_2$ to $V_0$. This pulse is applied via diodes 27 and 27' to both cells turning both switches on and causing the anodes of both switches to assume the $-V_1$ voltage of the cathode thus enabling readout of the stored conditions in any of the memory cells connected to the "0" and "1" outputs provided an appropriate readout control signal is applied to the memory call being read.

The "0" and "1" outputs are connected directly to the cathods of a pair of silicon control switches 28 and 29, respectively. Switches 28 comprises one element of memory cell $C_{ij}$ while switch 29 comprises another memory element of memory cell $C_{ij}$. The control gates of switches 28 and 29 are connected to the write line by resistors 30 and 30′ and diodes 31 and 31′, respectively. The anode gates of switches 28 and 29 are unconnected in this arrangement. The anodes are connected to the clear line $W_i$ by resistors 32 and 32′, respectively. A writing operation in cell $C_{ij}$ requires the simultaneous application of a write pulse to write line $W_i$. That is, the voltage on this line which is normally at $-V_2$ must be raised to $V_0$. At the same time either the 0 or 1 line must be changed from $+V_1$ to $-V_1$ to turn one or the other cell on. If both lines 0 and 1 are at $-V_1$, both cells will turn on, thus storing a 0 or 1 condition. This might be referred to as a 0 and 1 condition since upon readout both 0 and 1 will be indicated as being stored in the cell. This cell like the register $B_j$ provides four states of storage, 01, 10, 00 or 11. The storage will become apparent as the description continues.

When a write pulse is applied to the control gate of switches 28 and 29 and a $-V_1$ level is applied to the cathode of switch 28, conduction is established through the switch from the $+V_2$ voltage of the clear line through resistor 32 through the switch itself to the $-V_1$ level. Later the 0 line may return to $+V_1$ level and conduction will be maintained via diode 23. However, the voltage appearing at the anode is insufficient in this state to provide an output. The output condition will be described later. All that has been said about switch 28 applies with equal force to switch 29. Thus if the "1" output of stage $B_j$ is at $-V_1$ and a write pulse is applied to the control gate, then conduction will be established from the $+V_2$ voltage which the clear line normally is at through resistor 32′, switch 29 to the $-V_1$ supply voltage. Again, conduction is maintained through diode 23′ when the 1 line returns to $+V_1$. Of course, this conduction which we have just described can be interrupted by causing the clear line voltage to drop from $+V_2$ to $-V_1$ thus interrupting conduction and conduction must be reestablished as described above.

With the arrangement thus far described, once switches 28 or 29 are turned on, the anode will follow the cathode voltage. Thus, if the "0" or "1" line from stage $B_j$ of the input register goes to $-V_1$ volts, then the anode will follow and will forward bias a diode 34 and/or 34′ which is connected via resistor 35 or 35′, respectively, to the sum line $\Sigma_i$ to cause a unit of current equal to the current through resistor 35 to flow in the sum line. When switch 28 has been see to the "0" condition and is conducting to source $+V_1$ and line 0 goes negative,, a unit of current will be supplied to the line $\Sigma_i$ via resistor 35. Alternatively, if switch 29 is set to the "1" condition and is conducting, this same unit of current would be supplied via resistor 35′ and diode 34′ to the sum line $\Sigma_i$ when line 1 goes negative. If both switches are set and conducting and either of the "0" and "1" lines of stage $B_j$ goes to $-V_1$ volts, then one unit of current is supplied. Also if both switches are set and conducting and the "0" and "1" lines of stage $B_j$ go to $-V_1$ volts two units of current are supplied to the sum line $\Sigma_i$. This condition will not ordinarily be programmed, however, in certain instances it can prove useful and may be employed. If neither switch is set, no current will be supplied regardless of the potential of the "0" and "1" conductors from input registers stage $B_j$.

The anode of switch 28 is connected to the control electrode of a transistor 37, by a diode 38 and the readout control line is connected to the control electrode of transistor 37 via a diode 39. The control electrode is connected by a resistor 40 to the power supply voltage $-V_2$. Diodes 38 and 39 and resistor 40 comprise an AND circuit connected to the control electrode of transistor 37. Thus, transistor 37 is turned on only when the anode of switch 28 and the readout control line are simultaneously at the $-V_1$ level. The readout control line is normally at $+V_1$ and therefore the $-V_1$ voltage appearing at the anode of switch 28 is not seen at the control electrode except when readout control is switching to $-V_1$. An identical group of components with the same reference numerals primed are utilized in conjunction with switch 29 and perform the identical functions.

Operation of the input register $B_j$ and the memory cell $C_{ij}$ will be recapitulated at this time in the interest of clarity. When the clear line voltage is lowered from $+V_2$ to $-V_1$ conduction through switches 21 and 22 ceases. The output lines 0 and 1 go to $+V_1$. This defines the "mask" or "don't care" state of the register stage. If the stage is to store a 0, the set 0 line voltage is changed from $-V_2$ to $V_0$ after clearing. This establishes conduction through the switch 21 which is maintained after the $V_0$ subsides and the 0 output of the stage $B_j$ is substantially at $-V_1$ volts. If the stage is to be set to 1 after clearing the set 1 input is changed from $-V_2$ to $V_0$ and the anode of switch 22 goes from $+V_1$ to $-V_1$. If a read operation on the memory is to be conducted, the readout conductor is changed from $-V_2$ to $V_0$ which causes conduction in both switches 21 and 22 and the 0 and 1 output lines go from $+V_1$ to $-V_1$. If data is to be written in cell $C_{ij}$ it is first inserted in the stage $B_j$ as described above and a write signal is applied to the write $W_i$ line which causes one switch or the other to conduct depending on the nature of the data inserted in the input register. On a subsequent compare for addressing purposes, the data which is being used for addressing is inserted in the $B_j$ position as well as all other positions of the register. This data is compared with the state of switches 28 and 29. If for example a zero is set into $B_j$ and switch 28 has previously been set, a unit of current will be supplied on the sum line $\Sigma_i$ when the 0 line from cell $B_j$ causes the anode of switch 28 to go to $-V_1$. This forward biases diode 34 and one unit of current is drawn by resistor 35. Alternatively, if a one is set into $B_j$, no current would be supplied to line $\Sigma_i$ for this stage of the memory and register since switch 29 is cut off and a negative voltage on the "1" line will not forward bias diode 34′. Thus, no current can be added from this position to line $\Sigma_i$.

If readout of the complete word as opposed to readout of the matching bits, is desired the readout control line and the readout line to input register 11 are simultaneously activated causing negative voltage $-V_1$ to be simultaneously applied to the anodes of diodes 38 and 39 or the anodes of diodes 38′ and 39′ provided one of the cells 28 or 29 has been previously set and thus provides an output on either the "0" or "1" line. It switches 28 and 29 have both been set, an output will be provided on both the "0" and "1" lines. If neither has been set, the simultaneous applications of readout control and readout has no effect on the "0" and "1" output lines from cell $C_{ij}$.

In FIG. 3 constant current interlock circuit 14, a single decision unit DU and a single OR gate $O_i$ are illustrated. The decision units and OR gates are identical and connected in the manner illustrated in FIG. 3.

The constant current interlock circuit includes a first transistor 41 which has its emitter connected to a voltage source $+V_1$ via a resistor 42. The base of transistor 41 is connected to source $+V_1$ by a diode 43 and to ground via resistor 44. The collector of transistor 41 is connected to a line 47 common to all decision units. Line 47 is connected to the collector of an NPN transistor 45 which has its base connected to the match control line via a resistor 46 and its emitter directly connected to voltage source $-V_1$. The match control line is normally at $V_0$ and is lowered to $-V_2$ whenever a match is to be made. With the base of transistor 45 at voltage $V_0$, the transistor is in conduction and the collector of transistor 41 and line 47 is held at $-V_1$. With $-V_1$ on the common line to all the decision units, comparisons in the direction unit are inhibited.

When the match control voltage shifts to $-V_2$, transistor 45 is cut off and the negative voltage clamp on the collector of transistor 41 is removed. The voltage drop across diode 43 is used as a reference level and sets the value of the current through transistor 41. In addition, it establishes an upper voltage level for the common or interlock line 47. The voltage of interlock line 47 when released from the $-V_1$ clamp will, due to the current flowing through transistor 41, be between 0 and $+V_1$ volts with an absolute upper limit set at less than $+V_1$ volts. The actual voltage which common interlock line 47 settles to will be determined by the current drawn on sum lines $\Sigma_1$ through $\Sigma_m$ and the actual voltage will be slightly more positive than the value of the voltage appearing on the sum line having the highest number of matches. This will be apparent as the description FIG. 3 continues.

The sum line for each word in the memory is connected to its own decision unit. It is connected to the base of a transistor 48 and to a $+V_1$ voltage source by a resistor 49. Only one of the resistors 35 in the word line $W_1$ has been shown and it in combination with the others connected in parallel via a properly biased diode 34 and 34′ to the $-V_1$ supply voltage through a conducting switch 28 or 29 provides an equivalent resistance which controls in conjunction with resistor 49, the voltage at the base of transistor 48. The voltage and the value of resistors 49 and resistor 35 may be so selected that a minimum number of positions on any word line must be matched in order to cause transistor 48 to conduct. Since the current source connected to the emitter of transistor 48 is limited, the voltage on the interlock line 47 will be a function of the sum line providing the maximum number of matches, thus, only one of the transistors 48 in the decision units will become active if the sums on all of the lines differ from each other. The circuit may be designed by properly selecting resistor 42 so that two transistors 48 may be turned on if the summation on two sum lines $\Sigma$ are identical or within certain predetermined values.

The collector of transistor 48 is connected to the control gate of a silicon control switch 50 by a resistor 58 and by another resistor 59 to a voltage supply $-V_2$. The anode of silicon control switch 50 is connected by a resistor 51 to a clear line which is normally at $+V_2$ volts and is switched to $-V_1$ volts whenever it is desired to clear the set condition of silicon control switch 50.

The anode gate of switch 50 is connected to the anode and the cathode is connected to a voltage supply $-V_1$. Both the anode and the anode gate are clamped to a $+V_1$ voltage supply by a clamping diode 52. Thus, when conduction through the switch is established by conduction through transistor 48 and sufficient voltage drop across resistor 59 is provided to turn the switch on, the anode goes to substantially $-V_1$ and diode 52 is reversed biased. When the switch 50 is cleared by an application of a $-V_1$ pulse to the anode from the clear line, conduction through the switch is terminated and the anode is clamped at $+V_1$ via diode 52.

The anode of switch 50 is connected to line $M_1$ which in turn is connected to one input or OR circuit $O_1$, the other input of OR circuit $O_1$ is connected to line $ROW_1$ which provides readout under program control of word *i*. That is readout of line *i* may be accomplished either by enabling the readout control line via the $M_1$ line or via a separately energized $ROW_1$ line under program control.

Line $M_1$ is connected to the cathode of a diode 53 which with diode 54 and resistor 55 comprise an OR circuit. The OR circuit is connected to the base of a transistor 56 which acts as an emitter follower for driving the readout control line which was previously described in connection with FIGS. 1 and 2. Switch 50 is ordinarily cleared under program control after either the matching bits as previously described are read or after readout is initiated by applying the appropriate readout signal to the input register as described above.

In one embodiment of the invention, the values listed in the table below were used in the circuit.

| Resistors: | Ohms |
| --- | --- |
| **24, 24′, 51, 55** and **57** | 2K |
| **25, 25′** and **59** | 20K |
| **30** and **30′** | 180K |
| **35** and **35′** | 47K |
| **40** and **40′** | 56K |
| **42** | 1.2K |
| **44** | 470 |
| **46** | 4.7K |
| **49** | 1K |
| **58** | 10K |

Diodes:

| | |
| --- | --- |
| **26, 27, 26′, 27′, 38, 39, 39′, 23, 23′, 31, 31′, 34, 34′, 52, 53** and **54** | Type AA |
| **43** | Type AU |

Note: In order to achieve the required voltage, drop across diode 43, a pair of series connected AU diodes must be used.

Transistors:
37, 37′, 41 and 48 ---------- IBM 033 or equivalent.
Silicon controlled switches:
2, 22, 28, 29 and 50 ------ GE 3N58 or equivalent.
Voltages:
$+V_1=+6$ volts
$-V_1=-6$ volts
$V_0=$ground
$+V_2=+12$ volts
$-V_2=-12$ volts While the invention has been particularly shown and described with reference to a preferred embodiment thereof, it will be understood by those skilled in the art that various changes in form and details may be made therein without departing from the spirit and scope of the invention.

What is claimed is:

1. A multi-bit content-addressable memory responsive to a multi-bit binary coded signal for providing an indication of which word stored in the memory most nearly matches the word defined by the multi-bit binary coded signal comprising,
- an array of memory cells arranged in rows and columns, each of said rows storing a word and said columns defining corresponding bit positions in the stored words, each of said cells having an input and output and capable of assuming a first or second stable state corresponding to the stable states of the binary coded multi-bit signal in response to external control signals,
- means connecting each bit of the binary coded signal to the inputs of the corresponding column of storage cells to provide an output from a cell whenever the storage condition of the cell and the connected bit position of the binary coded signal are related in a predetermined manner,
- a plurality of summation circuit means each connected to the storage cell outputs of one row for providing a signal corresponding to the number of cells bearing the predetermined relationship to the corresponding bit of the binary coded signal, and
- means responsive to all of the summation means for indicating which summation means is connected to the row providing the largest signal and thus the best match.

2. A content-addressable memory as set forth in claim 1 in which the means responsive to the summation means for indicating which summation means provides the largest signal comprises:
- a constant current source,
- a plurality of decision units,
- means connecting said constant current source to said decision units and each decision unit to a unique summation circuit means,
- said decision units each including; circuit means responsive to the constant current source and to the signal provided by the summation circuit means for providing an output only on that unit which receives the largest signal from the connected summation circuit means.

3. A multi-bit content-addressable memory responsive to a corresponding multi-bit bipolar signal for providing an indication of which word stored in the memory most nearly matches the word defined by the corresponding multi-bit bipolar signal comprising:

an array of memory cells arranged in rows and columns, each of said rows storing a word and said columns defining corresponding bit positions in the stored words;

each of said memory cells including first and second storage elements having inputs and outputs and each said element capable of assuming first and second stable states corresponding to the stable states of the said bipolar signal in response to external control signals, means connecting each bipolar pair of signals to its corresponding column of memory storage element inputs respectively, to provide outputs when the bipolar signal and the associated memory storage elements are both in the first stable state, separate summation circuit means connected to the outputs of the memory storage elements in each row to provide a signal corresponding to the sum of the individual element outputs set forth above, and means responsive to the summation circuit means for indicating which summation means provides the largest signal to thus indicate the best match in the memory to the coded input signal.

4. A content-addressable memory as set forth in claim 3 in which the means responsive to the summation means for indicating which summation means provides the largest signal comprises:

a constant current source, a plurality of decision units, means connecting said constant current source to said decision units and each decision unit to a unique summation circuit means, said decision units each including; circuit means responsive to the constant current source and to the signal provided by the summation circuit means for providing an output only on that unit which receives the largest signal from the connected summation circuit means.

5. A content-addressable memory as set forth in claim 4 in which said first and second storage elements each include silicon controlled switches constructed of multi-region semiconductor material in which adjacent regions are of opposite conductivity and having a cathode region, a control gate region, an anode gate region and an anode region, said cathode region providing the storage input for the element and said anode region providing the output.

6. A content-addressable memory as set forth in claim 5 in which said summation circuit means comprises, a voltage supply, a common current limiting means connected to said supply and unidirectional current limiting means connected between each anode and the common current limiting means to provide a conductive current limiting path between the anode and the common current limiting means when the signal applied to the storage element input and the storage condition of the element bear a predetermined relationhip.

7. A multi-bit content-addressable memory responsive to a multi-bit binary coded electric signal for providing an indication of which word stored in the memory most nearly matches the word defined by the multi-bit binary signal comprising:

an input register responsive to the multi-bit binary signal for providing in parallel a bipolar binary signal corresponding to the said multi-bit binary input signal;

an array of memory cells arranged in rows and columns, each of said rows storing a word and each of said columns defining corresponding bit positions in the stored word;

each of said memory cells including first and second storage elements having inputs and outputs, each said element capable of assuming first and second stable states corresponding to the stable states of the said binary input signal in response to external control signals;

means connecting each bipolar pair of signals from the input register to its corresponding column of the memory storage element inputs respectively to provide outputs when the bipolar signals and the associated memory storage elements are both in the first stable state;

separate summation means connected to the output of the memory storage elements in each row to provide a signal corresponding to the sum of the individual element outputs set forth above; and means responsive to the summation means for indicating that summation means providing the largest sum to thereby indicate the best match in the memory for the coded input signal applied to the input register.

8. A multi-bit content-addressable memory as set forth in claim 7 in which said input register includes a plurality of stages equal in number to the number of bits in the binary signal applied thereto and each stage comprises:

first and second silicon control switches constructed of multi-region semiconductor material in which adjacent regions are of opposite conductivity and each having a cathode region, a control gate region, an anode gate region and an anode region, first circuit means connecting the cathode regions of the first and second silicon control switches to a first source of bias potential, second circuit means connecting the anode regions and the anode gate regions of said first and second silicon control switches to a second bias potential which under control of an external operating program may be switched from a first sustaining value to a second value for terminating conduction through both switches, and first and second input circuit means under control of said input signal connected to the control gate regions of the first and second switches, respectively, for initiating conduction through said first and second switches between the first and second bias potentials to provide a bipolar output at the anode regions of the first and second switches whenever one of the switches is rendered conductive by the input signal.

9. A multi-bit content-addressable memory as set forth in claim 8 in which the means responsive to the summation means for indicating which summation means provides the largest signal comprises:

a constant current source, a plurality of decision units, means connecting said constant current source to said decision units and each decision unit to a unique summation circuit means, said decision units each incuding; circuit means responsive to the constant current source and to the signal provided by the summation circuit means for providing an output only on that unit which receives the largest signal from the connected summation circuit means.

10. A multi-bit content-addressable memory as set forth in claim 9 in which said first and second storage elements each include silicon controlled switches constructed of multi-region semicondutor material in which adjacent rerions are of opposite conductivity and having a cathode region, a control gate region, an anode gate region and an anode region, said cathode region providing the storage input for the element and said anode region providing the output.

11. A multi-bit content-addressable memory as set forth in claim 10 in which said summation circuit means comprises, a voltage supply, a common current limiting means connected to said supply and unidirectional current limiting means connected between each anode and the common current limiting means to provide a conductive current limiting path between the anode and the common current limiting means when the signal applied to the storage element input and the storage condition of the element bear a predetermined relationship.

References Cited

IBM Technical Disclosure Bulletin, vol. 8, No. 3, August 1965, pp. 372–373, A. B. Lindquist, Associative Memory With Nearest Match.

IBM Technical Disclosure Bulletin, vol. 8, No. 3, August 1965, pp. 445–446, H. M. Beisner, Associative Memory Using Analog Summing Technique.

RAULFE B. ZACHE, Primary Examiner